(12) United States Patent
Todd et al.

(10) Patent No.: US 9,229,646 B2
(45) Date of Patent: Jan. 5, 2016

(54) METHODS AND APPARATUS FOR INCREASING DATA STORAGE CAPACITY

(75) Inventors: Stephen Todd, Shrewsbury, MA (US); Michael Kilian, Harvard, MA (US); Tom Teugels, Schoten (BE); Jan Van Riel, Geel (BE); Carl D'Halluin, Kortrijk (BE); Christophe Bouhon, La Reid (BE)

(73) Assignee: EMC Corporation, Hopkinton, MA (US)

( * ) Notice: Subject to any disclaimer, the term of this patent is extended or adjusted under 35 U.S.C. 154(b) by 2222 days.

(21) Appl. No.: 10/787,337

(22) Filed: Feb. 26, 2004

(65) Prior Publication Data

US 2005/0193084 A1    Sep. 1, 2005

(51) Int. Cl.
G06F 15/167 (2006.01)
G06F 3/06 (2006.01)

(52) U.S. Cl.
CPC ............. *G06F 3/0635* (2013.01); *G06F 3/067* (2013.01); *G06F 3/0607* (2013.01)

(58) Field of Classification Search
CPC ............ H04L 45/7453; H04L 45/7457; H04L 45/748; G06F 11/1064; G06F 17/30982
USPC ......................................................... 709/214
See application file for complete search history.

(56) References Cited

U.S. PATENT DOCUMENTS

| | | | | |
|---|---|---|---|---|
| 5,428,796 A * | 6/1995 | Iskiyan et al. | ................. | 710/240 |
| 5,530,897 A * | 6/1996 | Meritt | ................. | 710/9 |
| 5,627,990 A * | 5/1997 | Cord et al. | ................. | 711/122 |
| 5,764,895 A * | 6/1998 | Chung | ................. | 709/250 |
| 5,778,411 A * | 7/1998 | DeMoss et al. | ................. | 711/4 |
| 6,065,108 A * | 5/2000 | Tremblay et al. | ................. | 712/201 |
| 6,076,077 A * | 6/2000 | Saito | ................. | 705/51 |
| 6,173,374 B1 * | 1/2001 | Heil et al. | ................. | 711/148 |
| 6,807,632 B1 * | 10/2004 | Carpentier | ............ | H04L 67/108 380/28 |
| 6,889,225 B2 * | 5/2005 | Cheng et al. | | |
| 7,096,342 B2 * | 8/2006 | Chiu | ................. | G06F 3/0607 707/999.202 |
| 7,116,664 B2 * | 10/2006 | Davis et al. | ................. | 370/392 |
| 7,313,666 B1 * | 12/2007 | Saminda De Silva et al. | ................. | 711/173 |
| 7,366,834 B2 * | 4/2008 | McGovern et al. | ................. | 711/112 |
| 7,366,836 B1 * | 4/2008 | Todd et al. | ................. | 711/114 |
| 7,373,345 B2 * | 5/2008 | Carpentier | ........ | G06F 17/30097 |
| 7,376,681 B1 * | 5/2008 | Todd et al. | | |

(Continued)

FOREIGN PATENT DOCUMENTS

EP    0 881 580 A3    2/2002
GB    2379059 A    2/2003

OTHER PUBLICATIONS

European Search Report from European Patent Application 05004139.

(Continued)

*Primary Examiner* — Krista Zele
*Assistant Examiner* — Tariq Najee-Ullah
(74) *Attorney, Agent, or Firm* — Krishnendu Gupta; Joseph D'Angelo

(57) ABSTRACT

A environment and method are provided for increasing the storage capacity of a data storage environment. Additional storage clusters may be added to the storage environment without affecting the performance of each individual storage cluster. When data is written to the storage environment, a selection may be made as to which storage cluster is to store the data. When data is read from the storage environment, it may be determined which storage cluster stores the data and the data may be retrieved from that storage cluster.

110 Claims, 9 Drawing Sheets

| Hash | Timestamp | GUID |
|---|---|---|

701

(56) References Cited

U.S. PATENT DOCUMENTS

| | | | |
|---|---|---|---|
| 7,672,022 B1* | 3/2010 | Fan ................................. | 358/474 |
| 7,698,258 B2* | 4/2010 | Hoffman et al. ....... | 707/999.003 |
| 7,979,665 B1* | 7/2011 | Todd et al. .................... | 711/202 |
| 2002/0023080 A1* | 2/2002 | Uga et al. .......................... | 707/1 |
| 2002/0152352 A1* | 10/2002 | Ikegai et al. ................... | 711/108 |
| 2002/0174305 A1* | 11/2002 | Vartti ............................. | 711/145 |
| 2003/0037055 A1* | 2/2003 | Cheng et al. .................. | 707/100 |
| 2003/0121051 A1* | 6/2003 | Howe et al. ................... | 725/100 |
| 2003/0210689 A1* | 11/2003 | Davis et al. ................... | 370/389 |
| 2003/0233514 A1* | 12/2003 | Honig ........................... | 711/108 |
| 2004/0010612 A1* | 1/2004 | Pandya ......................... | 709/230 |
| 2004/0068652 A1* | 4/2004 | Carpentier et al. ........... | 713/168 |
| 2004/0220975 A1* | 11/2004 | Carpentier ........ | G06F 17/30097 |
| 2005/0005066 A1* | 1/2005 | Nakayama et al. ........... | 711/117 |
| 2005/0015471 A1* | 1/2005 | Zhang et al. .................. | 709/221 |
| 2005/0027862 A1* | 2/2005 | Nguyen et al. ................ | 709/225 |
| 2005/0066222 A1* | 3/2005 | Rowan et al. .................... | 714/5 |
| 2005/0080761 A1* | 4/2005 | Sundararajan et al. ............ | 707/1 |
| 2005/0091469 A1* | 4/2005 | Chiu .................... | G06F 3/0607 |
| | | | 711/203 |
| 2005/0097260 A1* | 5/2005 | McGovern et al. ........... | 711/100 |
| 2005/0125411 A1* | 6/2005 | Kilian et al. .................... | 707/10 |
| 2006/0004796 A1* | 1/2006 | Nakamura ..................... | 707/100 |
| 2006/0167843 A1* | 7/2006 | Allwright et al. .................. | 707/3 |
| 2007/0208788 A1* | 9/2007 | Chakravarty et al. ......... | 707/204 |
| 2007/0282806 A1* | 12/2007 | Hoffman et al. .................. | 707/3 |
| 2008/0222256 A1* | 9/2008 | Rosenberg et al. ........... | 709/206 |

OTHER PUBLICATIONS

EMC Corporation: "EMC Centera, Content Addressed Storage, Product Description Guide" [Online] Jun. 2002, XP007901787 USA; Retrieved from the Internet: URL: http://www.infront.net.au/hardward/centera/centera_guide.pdf>.

Tolia N. et al.: "Opportunistic Use of Content Addressable Storage for Distributed File Systems" Proceedings of the USENIX Annual Technical Conference, XX, XX, Jun. 9, 2013, pp. 127-140, XP009068169.

Ghamawat S. et al.: "The Goggle File System" Proceedings of the ACM Symposium on Operating Systems Principles, Oct. 19, 2003, pp. 1-15, XP001187142.

* cited by examiner

```
<Federation Policy>
1001 ──<Timeslice start="-1" end="101992093021">
1003 ──<FBN mod="1" result="0" cluster="C1"/>
      </Timeslice>
1005 ──<Timeslice start="101992093021" end="10199838383838">
1007 ──<FBN mod="2" result="0" cluster="C1"/>
1009 ──<FBN mod="2" result="1" cluster="C2"/><!--Added cluster C2-->
      </Timeslice>
1011 ──<Timeslice start="10199838383838" end="-1">
1013 ──<FBN mod="5" result="0" cluster="C1"/><!--C1 almost full-->
1015 ──<FBN mod="5" result="1" cluster="C2"/>
1017 ──<FBN mod="5" result="2" cluster="C2"/>
1019 ──<FBN mod="5" result="3" cluster="C3"/>
1021 ──<FBN mod="5" result="4" cluster="C3"/><!--Added cluster C3-->
      </FederationPolicy>
```

METHODS AND APPARATUS FOR INCREASING DATA STORAGE CAPACITY

FIELD OF THE INVENTION

The present invention relates to data storage and, more particularly, to methods and apparatus for increasing data storage capacity.

DESCRIPTION OF THE RELATED ART

The capacity and performance of a data storage system depends on the physical resources of the storage system. For example, the quantity of data that a storage system is capable of storing is dependent on the number and capacity of the physical storage devices that the storage system possesses. As the quantity of data stored on the storage system approaches the storage capacity of the storage system, it may be desired to increase the storage system capacity by adding additional physical storage devices to the storage system. However, there may be physical limits imposed by the hardware configuration of the storage system on the number of storage devices that the storage system may have. Consequently, when a storage system approaches or nears it storage capacity, it may no longer be possible or desirable to add more physical storage devices to the storage systems. Rather, if it is desired to increase storage capacity, one or more additional storage systems may be used.

SUMMARY OF THE INVENTION

One illustrative embodiment is directed to a method of accessing a unit of data stored in a storage environment that includes a plurality of storage clusters. The method comprises acts of: receiving a request from a host computer to locate the unit of data previously stored in the storage environment; and in response to receipt of the request, determining on which one of the plurality of storage clusters the unit of data is stored. Another illustrative embodiment is directed to at least one computer readable medium encoded with instructions that, when executed on a computer system, perform the above-described method.

A further illustrative embodiment is directed to an apparatus for storing data. The apparatus comprises: an input that receives a request from a host computer to locate a unit of data on at least one of a plurality of storage clusters in a storage environment, and at least one controller, coupled to the input, that: receives the request from the input; and in response to receipt of the request, determines on which of the plurality of storage clusters the unit of data is stored.

Another illustrative embodiment is directed to a method of accessing a unit of data stored in a storage environment that includes a plurality of storage clusters, the storage environment storing data for a host computer. The method comprises acts of: receiving a request from an application program executing on the host computer to store a unit of data; and in response to receipt of the request, selecting one of the plurality of storage clusters to store the unit of data in a manner that is transparent to the application program so that the application program is not made aware that the selected one of the plurality of storage clusters stores the unit of data. A further illustrative embodiment is directed to at least one computer readable medium encoded with instructions that, when executed on a computer system, perform the above-described method.

A further illustrative embodiment is directed to an apparatus for storing data. The apparatus comprises: an input that receives a request from an application program executing on a host computer to store a unit of data on at least one of a plurality of storage clusters in a storage environment, and at least one controller, coupled to the input, that: receives the request from the input; and in response to receipt of the request, selects one of the plurality of storage clusters to store the unit of data in a manner that is transparent to the application program so that the application program is not made aware that the selected one of the plurality of storage clusters stores the unit of data.

Another illustrative embodiment is directed to a method of accessing a unit of data stored in a storage environment that includes a plurality of storage clusters. The method comprises acts of: receiving a request from an application program executing on a host computer to store a unit of data; selecting one of the plurality of storage clusters to store the unit of data; and storing the unit of data on the selected one of the plurality of storage clusters without storing information identifying the selected one of the plurality of storage clusters. A further illustrative embodiment is directed to at least one computer readable medium encoded with instructions that, when executed on a computer system, perform the above-described method.

Another illustrative embodiment is directed to an apparatus for storing data comprising: an input that receives a request from an application program executing on a host computer to store a unit of data on at least one of a plurality of storage clusters in a storage environment, and at least one controller, coupled to the input, that: receives the request from the input; selects one of the plurality of storage clusters to store the unit of data; and stores the unit of data on the selected one of the plurality of storage clusters without storing information identifying the selected one of the plurality of storage clusters.

BRIEF DESCRIPTION OF THE DRAWINGS

FIG. 10 is a diagram illustrating an exemplary record that may be used to track storage algorithms used to store data among multiple storage clusters, in accordance with one embodiment of the invention.

DETAILED DESCRIPTION

On application for aspects of the present invention described herein relates to content addressable storage in a distributed storage environment that includes a plurality of interconnected independent nodes. Such an environment is described in the commonly assigned U.S. applications shown in Table 1, each of which is incorporated herein by reference in its entirety. The applications listed in Table 1 are referred to collectively herein as the Related applications.

TABLE 1

| Title | Serial No. | Filing Date |
|---|---|---|
| Content Addressable Information, Encapsulation, Representation, And Transfer | 09/236,366 | Jan. 21, 1999 |
| Access To Content Addressable Data Over A Network | 09/235,146 | Jan. 21, 1999 |
| System And Method For Secure Storage Transfer And Retrieval Of Content Addressable Information | 09/391,360 | Sep. 7, 1999 |
| Method And Apparatus For Data Retention In A Storage System | 10/731,790 | Dec. 9, 2003 |
| Methods And Apparatus For Facilitating Access To Content In A Data Storage System | 10/731,613 | Dec. 9, 2003 |
| Methods And Apparatus For Caching A Location Index In A Data Storage System | 10/731,796 | Dec. 9, 2003 |
| Methods And Apparatus For Parsing A Content Address To Facilitate Selection Of A Physical Storage Location In A Data Storage System | 10/731,603 | Dec. 9, 2003 |
| Methods And Apparatus For Generating A Content Address To Indicate Data Units Written To A Storage System Proximate In Time | 10/731,845 | Dec. 9, 2003 |
| Methods And Apparatus For Modifying A Retention Period For Data In A Storage System | 10/762,044 | Jan. 21, 2004 |
| Methods And Apparatus For Extending A Retention Period For Data In A Storage System | 10/761,826 | Jan. 21, 2004 |
| Methods And Apparatus For Indirectly Identifying A Retention Period For Data In A Storage System | 10/762,036 | Jan. 21, 2004 |
| Methods And Apparatus For Indirectly Identifying A Retention Period For Data In A Storage System | 10/762,043 | Jan. 21, 2004 |

Figure 1:
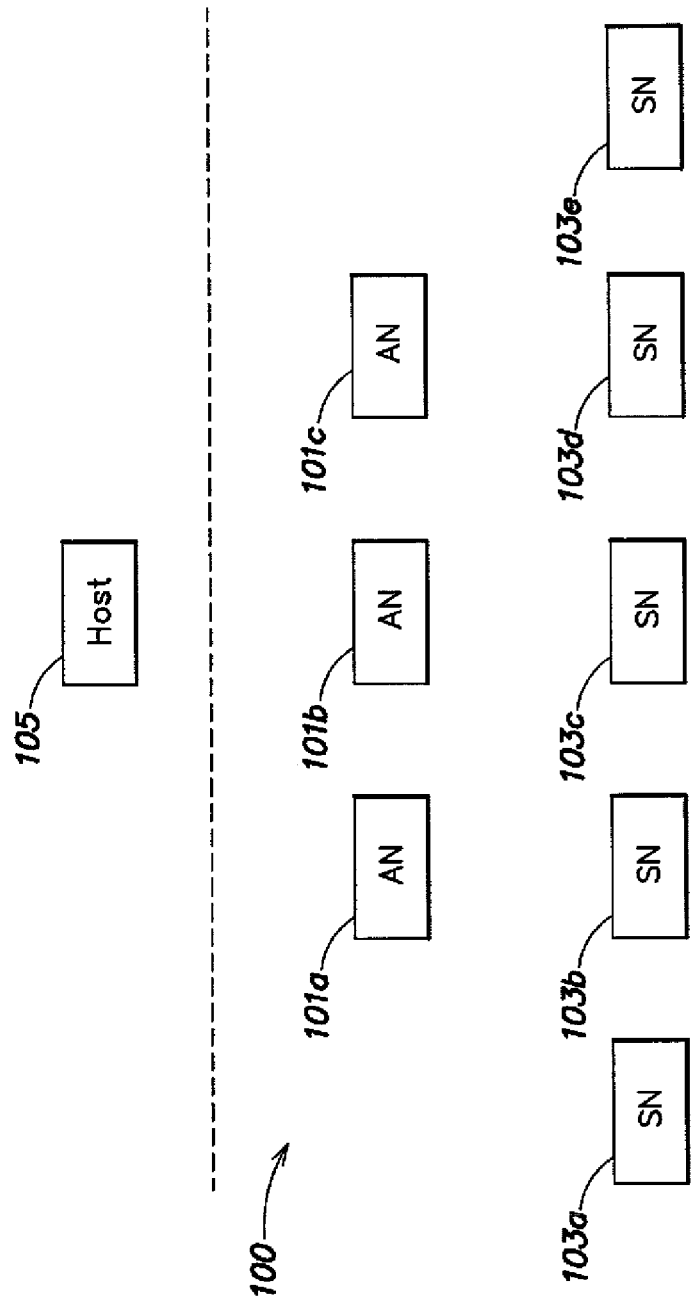
FIG. 1 is a block diagram of a distributed storage environment on which embodiments of the present invention may be implemented.

An example of a distributed storage environment 100 is shown in FIG. 1. Distributed storage environment 100 includes a plurality access nodes 101a-101c and a plurality of storage nodes 103a-103e. Access nodes 101 may receive and respond to access requests from a host computer 105, and storage nodes 103 may store data sent to storage environment 100 by host computer 105. Access nodes 101 and storage nodes 103 may be coupled by a network (not shown) and communicate over the network such that each node may make its presence on the network known to the other nodes. In this manner, the nodes may operate together to process access requests and store data for host computer 105.

Each node may include processing resources (e.g., processor and memory) and storage devices. The nodes communicate with each other to store data, respond to access requests, and perform other environment functions. To a user of the storage environment (e.g., the host computer 105 or an application program executing thereon), the storage environment may appear as single entity. That is, the user need not be aware that the storage environment includes a plurality of separate nodes or on which storage node a certain unit of data is stored or mirrored.

To increase the storage capacity of the storage environment 100, more storage nodes may be added and coupled to the network. These additional storage nodes may make their presence known on the network, thus allowing access nodes 101 to employ the additional storage in the storing of data. Adding more storage nodes to the storage network without increasing the number of access nodes may result in the access nodes acting as a bottleneck for the storage environment and a degradation in performance. Thus, it may desirable when increasing the number of storage nodes to also increase the number of access nodes.

Storage environment 100 may perform a number of functions described in the above-referenced Related applications, such as determining on which storage node 103 to store data in response to a write request from host 105, determining on which storage node 103 data is stored in response to a read request from host 105, performing garbage collection of data that may be deleted from the storage environment, enforcing retention periods that specify a period of time that data should not be deleted from the storage environment, mirroring data (i.e., creating one or more mirror copies on different nodes of the storage environment), self-healing to compensate for failure of one or more nodes, and other functions. Such functions may be performed by storage nodes, access nodes, or both, and performing such functions may cause network traffic between the nodes.

For example, to perform self-healing functions, other nodes may detect when a node fails. In response, the environment 100 may re-direct access requests to data stored on the failed node to other nodes that store a mirrored copy of that data and may build another mirror for continued fault tolerance. A node may broadcast keep-alive messages on the network to indicate that it is operational and has not failed. If keep-alive messages from that node are not received by other nodes, the other nodes may determine that the node has failed. Adding more nodes to the storage environment causes more keep-alive messages to be transmitted on the network and results in more network traffic.

As another example, the storage environment 100 may maintain an index such as the blob location index (BLI) described in the Related applications, to aid in locating data. The BLI may specify on which storage node units of data are stored. Each access or storage node in the network may be responsible for administering a portion of the BLI. Because the BLI may be distributed across the access and/or storage nodes, maintaining and updating the BLI when units of data are written to or deleted from the storage environment causes network traffic to be generated among nodes. Adding more nodes may cause the administration responsibilities of the BLI to be shared among a greater number of nodes, thus casing a greater amount of network traffic to be generated.

Other functions, including some described in the Related applications, such as performing garbage collection, locating content on the storage environment (e.g., via a broadcast message to all nodes), and re-ranging the BLI (i.e., when nodes are added or removed from the storage environment), may cause a greater amount of network traffic as nodes are added to the storage environment. Such increased network traffic may result in a decrease in performance of the storage environment.

As mentioned above, storage nodes 103 may be added to the storage environment to increase the storage capacity of the storage environment. Additionally, access nodes 101 may be added to counteract degradation in performance caused by adding the additional storage nodes. However, Applicants have appreciated that because adding access nodes and storage nodes causes increased network traffic, once a certain number of nodes in the storage environment is reached, the performance benefit gained by adding additional nodes is offset at least somewhat by the increased network traffic generated by the nodes in the storage environment, as well as the increased amount of processing resources used in performing the infrastructure functions (such as those described above) that support the storage environment. Thus, as additional nodes are added to the storage environment to increase storage capacity and/or performance, the overall performance of the storage environment may increase less than expected, or might in some cases even decrease. This performance impact is referenced below as performance degradation, which term is used herein to refer to not only actual decreases in performance, but also performance improvements that are less than would be expected to be achieved through the addition of an additional storage resource.

One embodiment of the invention is directed to providing additional storage clusters that work together to provide combined storage, but that are independent so that the addition of an additional storage node in one cluster does not raise the performance degradation issues discussed above for other clusters. As used herein, the term storage cluster refers to a group of one or more interconnected nodes that share at least one software utility that logically connects them. For example, the nodes of a storage cluster may share a self-healing software utility, such that nodes in a cluster monitor keep-alive messages transmitted by other nodes in that cluster, but not by nodes outside the cluster. The nodes may also share a common BLI so that the BLI of one storage cluster may be independent of the BLI of any other storage cluster. The nodes of a storage cluster may also, or alternatively, share other utilities such as a garbage collection utility and/or a data mirroring utility that keeps track of where data stored in the cluster is mirrored. In one embodiment, each node in a cluster knows the address (e.g., an IP address) of every other node in the cluster, although the present invention is not limited in this respect.

Because nodes in a storage cluster do not share software utilities with nodes outside the cluster (e.g., in a different storage cluster), the internal network traffic and use of processing resources of the nodes within one storage cluster does not affect the performance of any other storage cluster. Consequently, an additional storage cluster may be added to a storage environment to increase storage capacity without experiencing the above-described performance degradation issues.

It should be appreciated that the description of the types of software utilities that may be shared among nodes in a cluster (but not shared among nodes in different clusters) is provided merely for the purposes of illustration, and that the aspects of the present invention described herein are not limited to use in a storage environment wherein the nodes in a storage cluster share the particular types of software utilities discussed above, or any other particular type of software utility. Similarly, while examples of a storage environment having characteristics such as those described in the Related applications are described herein for illustrative purposes, it should be appreciated that the aspects of the present invention described herein are not limited in this respect, and can be employed in storage environments having numerous other configurations. For example, the reference to a storage cluster comprising one or more interconnected nodes is not limited to an access node and storage node configuration as described in connection with the Related applications, as the reference to a node can refer to any device or collection of devices that function together as an entity.

In one embodiment of the invention, multiple storage clusters are managed in a manner that is transparent to users (e.g., host computers or application programs executing thereon) of the storage environment, so that users need not know on which storage cluster a particular unit of data is stored to access that unit of data. Thus, application programs that store data to and retrieve data from the storage environment may treat the multiple storage clusters as a single storage environment, without knowledge of on which cluster data written to the storage environment is stored. Thus, in one embodiment of the invention, when an application program (e.g., on a host) issues a write request for a unit of data to the storage environment, it is determined on which storage cluster the unit of data is to be written, and when the application issues a read request, it is determined on which storage cluster the data is stored, both in a manner transparent to the application program.

The present invention is not limited to any particular implementation technique as to where the aspects of the computer system that determine on which storage cluster to store a unit of data and that retrieve a previously written unit of data from the appropriate cluster are practiced. In one embodiment, these functions may be performed by an application programming interface (API) on the host computer. This implementation is described below in connection with FIG. 2.

Figure 2:
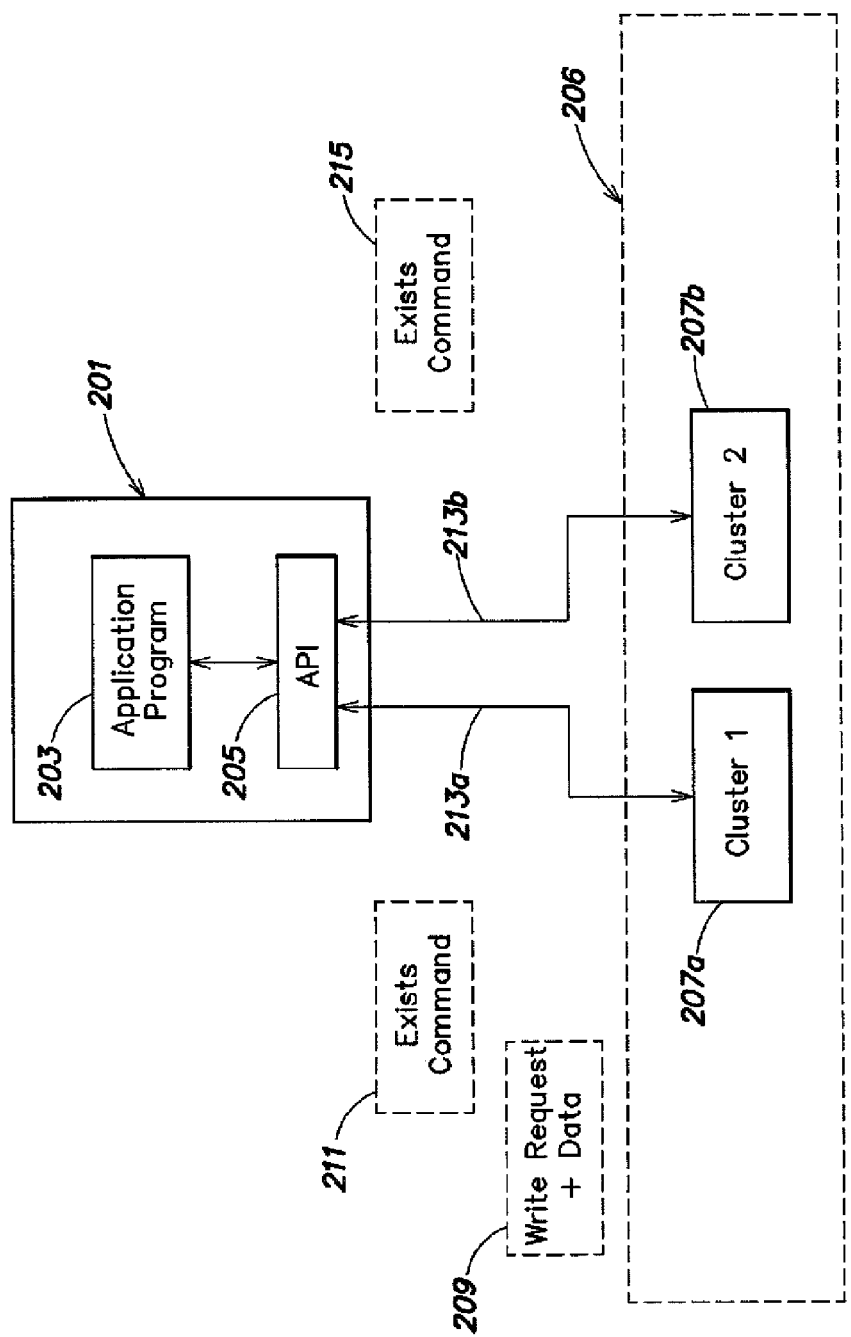
FIG. 2 is a block diagram of a host computer interacting with multiple storage environments or clusters via an API, in accordance with one embodiment of the invention.

FIG. 2 shows a host computer 201 that communicates with a storage environment 206 that includes two storage clusters, 207a and 207b. Host computer 201 executes an application program 203 that reads and writes units of data, and an application programming interface (API) 205 that is adapted to interface with the storage environment 206. Host 201 may be, for example, a server that provides resources (e.g., data storage, email, and other services), a client (e.g., a general-purpose computer environment operated by a user), a network component (e.g., a switch) or any other type of computer. Host 201 is coupled by a communication links 213a and 213b to storage clusters 207a and 207b of storage environment 206 so that the host 201 can use the storage environment 206 to store and retrieve data. The links 213a and 213b can be any type of communication link, including any type of network or direct connection.

Application program 203 may be any computer application program that a user or administrator of host 201 uses and that stores data to and/or retrieves data from storage environment 206. Application program 203 is linked with API 205 so that application program 203 may use API 205 to communicate with the storage clusters 207. In one embodiment, application program 203 need not be aware that storage environment 206 even includes multiple storage clusters, as the management of data storage between the clusters 207 may be done in a manner transparent to the application program 203.

API 205 may be implemented in any suitable way. For example, API 205 may include computer object code that is provided to the programmer of application program 203. The computer object code includes routines that may be used to communicate with the storage environment. When linked with API 205, an application program may call these routines to communicate with storage environment 206. API 205 may be linked with any number of applications, and shields the programmer of application program 203 from the internal protocol by which storage environment 206 communicates.

When application program 203 calls a routine or routines of API 205 to write data to storage environment 206, API 205 may select a storage cluster to store the data and send a write request 209 including the data to the appropriate storage cluster. The selection of the storage cluster may be performed using any suitable technique. For example, the API 205 may employ a round robin scheme by which the clusters in the storage environment are selected sequentially for each write request. In the example in FIG. 2, API 205 could alternate between selection of storage cluster 207a and storage cluster 207b for processing write requests. Alternatively, the API 205 may select a storage cluster to store the data based on, for example, the available storage capacity on each storage cluster, the load on each storage cluster, the size or type of the data to be stored, or any other suitable criteria. The load on a storage cluster may be determined, for example, based on factors such as how many objects (e.g., blobs or CDFs) are being processed by the storage cluster, how busy the CPU(s) of the storage cluster are, how busy the disk(s) of the storage cluster are, and/or any other suitable factor.

When application program 203 calls a routine or routines of API 205 to read a previously stored unit of data from the storage environment, API 205 may determine on which storage cluster the requested unit of data is stored. This can be done in any suitable way. For example, the API 205 may store information that identifies the cluster on which each data unit is stored. However, in another embodiment no such information is stored, and the API 205 determines where the data is stored in response to a read request.

In one embodiment, API 205 sends a command that identifies the requested unit of data to each storage cluster in the storage environment and requests the storage cluster to determine if the specified unit of data is stored in that cluster. The command can be a read command, or a command (referred to herein as an "exists command") that does not seek to read the data unit but only to determine on which cluster it is stored.

The commands may be sent to the storage clusters either serially or in parallel, as the invention is not limited in this respect. For example, if sending the commands serially, API 205 may first send an exists command 211 to storage cluster 207a. If cluster 207a responds that the unit of data is stored therein, API 205 may then send a read request for that unit of data to storage cluster 207a and need not send any additional exists commands to other clusters. If cluster 207a responds that the unit of data is not stored therein, API 205 may then send another exists command 215 to cluster 207b. If cluster 207b responds that the specified unit of data is stored therein, API 205 may then send a read request to cluster 207b for the unit of data. If API 205 sends the exists commands in parallel, then exists command 211 and exists command 213 may be sent to clusters 207a and 207b, respectively, at approximately the same time. When one of the storage clusters responds to API 205 that the specified unit of data is stored therein, then API 205 may send a read request for the unit of data to that storage cluster. As mentioned above, instead of employing exists commands followed up by read requests, API 205 may only issue read requests (i.e., without issuing exists commands) to the storage clusters either serially or in parallel.

Sending the exists commands or read requests in parallel provides the advantage that the time spent in locating the unit of data is reduced because each cluster is performing a search for the unit of data simultaneously. However, these simultaneous searches consume the processing resources (and thereby impact performance) on each of the clusters, even though such searches will fail on many of the storage clusters. Conversely, sending the exists or read commands serially may increase the time spent in locating the unit of data because the exists command is not sent to a storage cluster until the search on the preceding storage cluster completes, but the performance of the storage environment may not be impacted as greatly because some clusters will not need to perform a search for units of data found before the exists command or read request is sent to those clusters. The search within each cluster can be performed in any suitable manner, as the present invention is not limited in this respect. Examples of searching techniques are described in the above-referenced Related applications.

To reduce the overall processing load incurred by the storage clusters in searching for a unit of data, the API 205 may orchestrate a layered searching approach wherein clusters initially perform a relatively cursory (and not computationally intensive) search, and perform a more thorough search only when necessary (e.g., when the cursory search among all clusters does not result in a successful search).

For example, as described in the Related applications, each cluster may include a BLI that identifies some of the data units stored on the cluster. A relatively cursory search may involve initially searching only the BLI in a cluster, which is relatively quick and comparatively inexpensive. If a BLI search (either serially or in parallel) fails for all clusters in the environment, a more thorough search may be performed. It should be appreciated that the BLI search is merely one example of a technique for performing a relatively cursory search and that other techniques are possible, as the aspect of the present invention that employs a layered searching approach is not limited in this respect. Further, it should be appreciated that the aspects of the present invention described herein are not limited to use with a storage environment having the configuration shown in the Related applications, and is not limited to storage clusters that employ a BLI.

In the example of FIG. 2, storage environment 206 is shown as having two storage clusters. It should be appreciated that this is given only as an example, as storage environment 206 may include three or more storage clusters, as the invention is not limited in this respect. Similarly, FIG. 2 shows only a single host computer 201 sending data to and receiving data from storage environment 206. However, it should be appreciated the storage environment 206 may operate with many more host computers, as the invention is not limited in this respect.

In the environment discussed above, the aspects of the present invention that relate to selecting of the storage clusters to store the data, and/or the determining of which of the clusters stores a previously-written unit of data is implemented by the API. However, it should be appreciated that this explanation is provided merely for illustrative purposes, as the present invention is not limited in this respect. As mentioned above, an advantage of one illustrative embodiment of the present invention is that the implementation of the storage environment among multiple clusters is transparent to an application program executing on the host, so that the application program need not even be aware that multiple clusters exist, and need not be concerned with the overhead associated with managing multiple clusters. However, other aspects of the present invention are not limited in this respect, such that the management of the multiple clusters can alternatively be implemented in a manner that is not transparent to the application program. In addition, whether the management of multiple clusters is transparent to the application program or not, such management need not be implemented in an API in the manner described above, as it can alternatively be implemented in other locations of the computer system. For example, in one embodiment of the present invention, the management of multiple clusters can be implemented within the clusters themselves. In this embodiment, the API may see only a single cluster, but the clusters are capable of communicating among themselves to manage the distribution of data among the multiple clusters. Alternatively, the API may see all the access nodes of all the clusters, but may not be aware that these nodes are divided amongst two or more clusters, such that the API may send any access request to any access node, regardless of which cluster the access node forms a part. In an alternative embodiment of the present invention, the management of the multiple clusters can be implemented in an appliance that it is separate from any of the clusters and from the host. The appliance can take any of numerous forms, and may be, for example, a network component (e.g. a router) that forms part of a network for interconnecting the host computer with the storage clusters.

Figure 3:
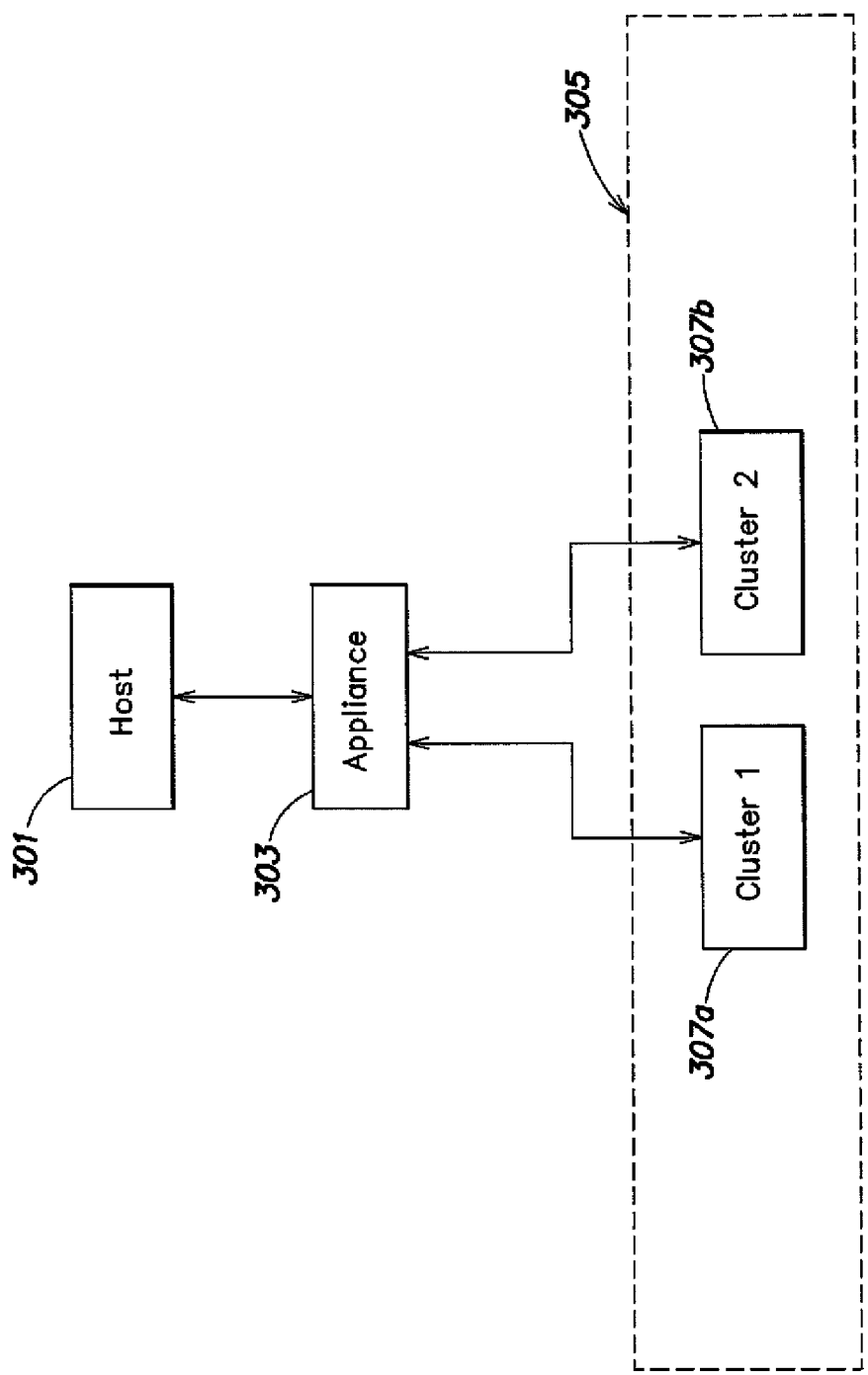
FIG. 3 is a block diagram of a host computer interacting with multiple storage clusters via an external appliance, in accordance with another embodiment of the invention.

FIG. 3 provides one illustrative representation of the embodiment in which the determination of on which storage cluster to store a unit of data (in the case of a write request) and on which storage cluster a previously written unit of data is stored (in the case of a read request) is made by an appliance 303. Appliance 303 receives access requests from a host 301 to storage environment 305. Appliance 303 may then route the access request to the appropriate storage cluster. Appliance 303 may be, for example, a computer coupled to host 301 and storage environment 305 (e.g., via a network) that performs functions that allow applications executing on host 301 to access storage clusters as a single storage environment. Alternatively, appliance 303 may be included within storage environment 305.

Appliance 303 may use any suitable technique to determine on which storage cluster to store a unit of data, and for determining on which storage cluster a previously written unit of data is stored, as the present invention is not limited in this respect.

As should be appreciated from the foregoing, with the embodiment of FIG. 3, an application program or API executing on host computer 301 need not even be aware that storage environment 305 includes multiple storage clusters. Further, the application program or API may write a unit of data to or retrieve a unit of data from storage environment 305 without knowing where the particular unit of data is stored. The host computer may simply send access requests to appliance 303, which then determines where to a write a unit of data or where a previously written unit of data is stored.

In the example of FIG. 3, storage environment 305 is shown having two storage clusters. It should be appreciated that this is given only as an example, as storage environment 305 may include three or more storage clusters as the invention is not limited in this respect. Similarly, FIG. 3 shows only a single host computer 301 sending data to and receiving data from storage environment 305 However, it should be appreciated the storage environment 305 may operate with many more host computers and the invention is not limited in this respect. Further, although FIG. 3 depicts only a single appliance 303 operating between host 301 and storage environment 305, multiple appliances may be used. In this manner, a bottleneck, wherein all access requests to the storage environment are processed by a single appliance, may be avoided. Additionally, although in the example of FIG. 2, an API is employed to communication between the host computer and the storage environment, some embodiments of the invention do not require the use of an API and may allow the application program to communicate directly with the storage environment.

Figure 4:
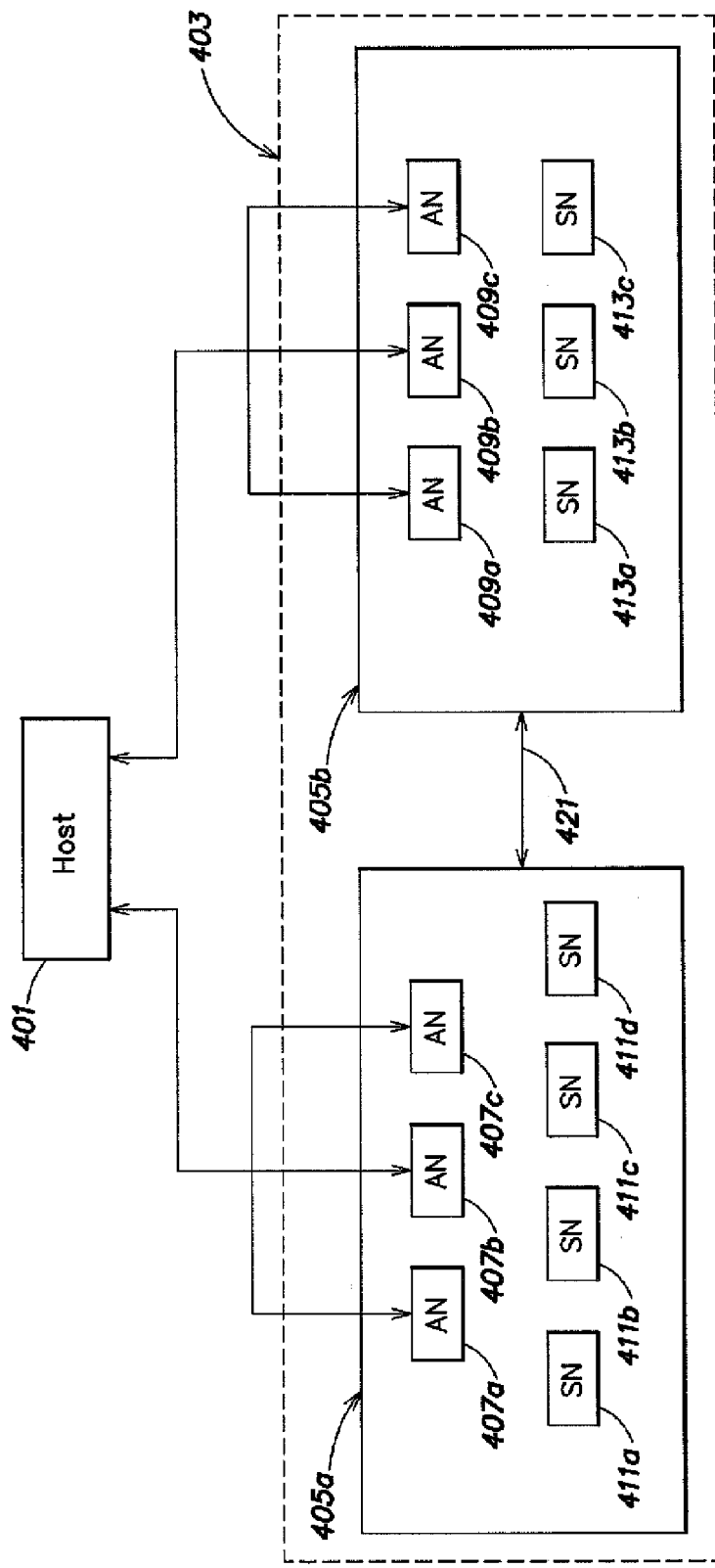
FIG. 4 is a block diagram of a host computer interacting with a storage environment that includes multiple storage clusters, in accordance with a further embodiment of the invention.

FIG. 4 provides one illustrative representation of the embodiment in which the storage clusters themselves may make the determination of on which storage cluster to store a unit of data (in the case of a write request) and on which storage cluster a previously written unit of data is stored (in the case of a read request or a delete request). In the example of FIG. 4, a host computer 401 communicates with a storage environment 403 that includes two storage clusters, 405$a$ and 405$b$. Storage cluster 405$a$ includes a plurality of access nodes 407$a$-$c$ and a plurality of storage nodes 411$a$-$d$, and storage cluster 405$b$ includes a plurality of access nodes 409$a$-$c$ and a plurality of storage nodes 413$a$-$c$ in much the same manner as discussed above in connection with FIG. 1. In this embodiment of the invention, at least one storage cluster is aware of the presence of the other storage cluster(s) in the storage environment, but each cluster is an independent cluster (e.g., each cluster has independent software utilities). As shown at 421 in FIG. 4, there is a communication path among the clusters 405$a$, 405$b$ to enable them to communicate. This communication path can be implemented in any suitable way, as the present invention is not limited in this respect.

When an access node 407 or 409 receives a request to retrieve a unit of data, the access node may determine whether the requested unit of data is stored in its cluster. If it is not, the access node may send exists commands and/or read commands to the other storage clusters in the storage environment, either serially or in parallel, in much the same manner as described above.

Application programs executing on host computer 401 may send access requests (e.g., via an API) to the access nodes 407 and 409 of storage clusters 405$a$ and 405$b$. In one embodiment, the application program and/or API is unaware that access nodes 407 and 409 belong to different storage clusters. From the point of view of the application program and/or API, access nodes 407 and 409 may receive access requests, regardless of which storage cluster stores a requested unit of data. Indeed, the application program and/or API need not even be aware that storage environment includes multiple storage clusters, such that where data is stored on the storage environment is transparent to the application program and/or API in one embodiment of the invention.

When an access node 407 or 409 receives a request to write a unit of data from host 401, the access node may determine whether to store the unit of data on its cluster or send the unit of data to another cluster for storage. Such a determination may be made based on any suitable factor, examples of which were discussed above (e.g., a round robin scheme, the size or type of the data to be stored, the available capacity on each of the storage clusters, the current processing load on each of the storage clusters).

Alternatively, instead of allowing an application program and/or API to send requests to any access nodes in the storage environment, the application program and/or API may only be permitted to send access requests to the access nodes of one storage cluster (e.g., cluster 405$a$). The access nodes of this storage cluster are then responsible for writing data to and retrieving data from the storage cluster of which they are a part, and/or other storage clusters in the storage environment of which the access nodes are not a part.

In one embodiment, aspects of the invention can be employed with content addressable storage (CAS) environments of the type described in the Related applications. In a content-addressable storage environment, data is stored using a content address generated based upon the content of the data itself. The content address may be generated by applying a hash function to the data to be stored. The output of the hash function may be used as at least part of the content address used in communication between the host and storage environment to refer to the data. The content address can be mapped (e.g., within the storage environment) to one or more physical storage locations within the storage environment.

Figure 5:
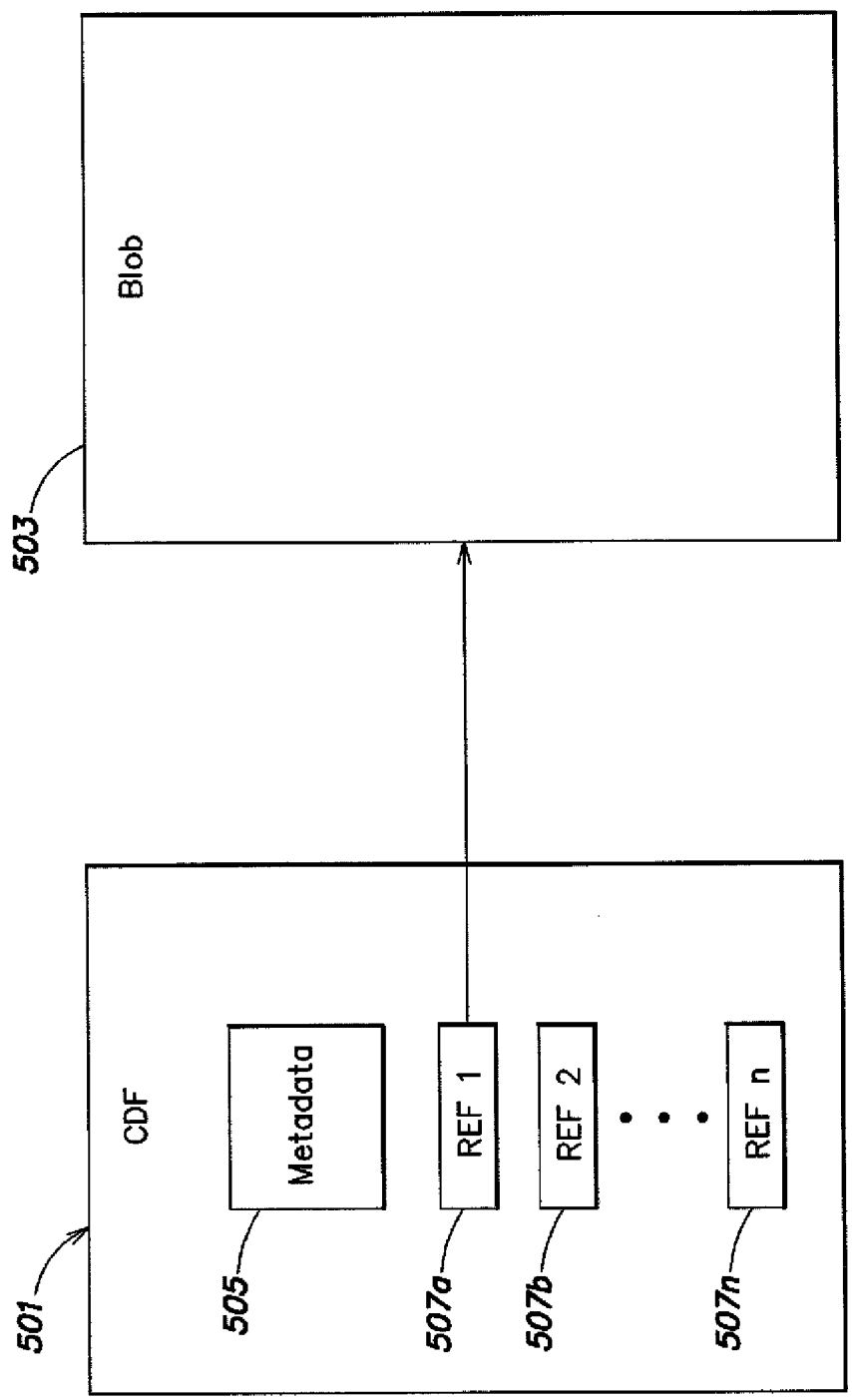
FIG. 5 is a block diagram illustrating an exemplary manner in which data may be stored on a storage environment, in accordance with one embodiment of the invention.

A unit of data in the architecture defined in the CAS applications is referred to as a blob. As illustrated in FIG. 5, blob 503 may be, for example, a unit of binary data to be stored by a host on a storage environment (e.g., storage environment 105), such as, for example, a patient x-ray, company financial records, or any other type of data. When the blob 503 is stored to the content addressable storage environment, a unique address is generated for the blob 503 based upon its content.

Each blob 503 has at least one content descriptor file (CDF) 501 associated with it. CDF 501 may include metadata 505 and a plurality of references 507*a*, 507*b*, . . . , 507*n*. A CDF may reference one or more blobs or other CDFs. Thus, the references 507 may be, for example, references to the blobs and/or CDFs referenced by CDF 501. Metadata 505 may, for example, include the creation date of CDF 501 (e.g., the date that CDF 501 was stored on the storage environment), a description of the content of blob 503, and/or other information.

As discussed above, a storage environment may employ a garbage collection utility to clean up blobs and CDFs that are available for deletion. In one implementation of the system described in the Related applications, a blob or CDF is available for deletion when it is not referenced by any CDFs.

Blobs and their corresponding CDFs may be written separately to the storage environment. In accordance with one embodiment of the invention, a blob and the CDF(s) that reference(s) it may be stored on different storage clusters. This may present challenges when used on a system that employs a garbage collection utility that relies on the absence of a CDF pointing to a blob to delete the blob, and that in response to deletion of a CDF updates any blobs previously referenced thereby to delete a pointer to the CDF. For example, when a CDF is deleted and any blobs that it references are stored on different storage clusters, the garbage collection utility may first search the storage cluster on which the CDF is stored for the referenced blobs. When it does not find the referenced blobs on that storage cluster, it may locate the blobs on other storage clusters (e.g., via exists commands and/or read requests), and indicate to the storage clusters that store the blobs that the reference to the deleted CDF should be removed. This process may incur significant overhead in communication between clusters. Furthermore, in some embodiments, it may be desirable to have each storage cluster not even be aware that there are other related storage clusters in the storage environment, such that a cluster might not know to look to other clusters for a referenced blob when a CDF is deleted.

In one embodiment of the invention, the above-described challenges are alleviated by storing a blob and the CDFs that reference that blob on the same storage cluster. This may be accomplished in any suitable way. For example, the same placement algorithms discussed above with reference to FIGS. 2-4 can be employed, but a blob and the CDF(s) that reference it can be written to the storage environment in a single write transaction so that the blob and the CDF are written to the same storage cluster. If, at a later time, additional CDFs that reference the blob are written to the storage environment, the entity determining the location for storing the additional CDFs (e.g., API, appliance, or storage cluster) may first determine which storage cluster stores the blob and then store the additional CDFs to that same storage cluster.

In one embodiment of the invention, application programs keep track of previously stored data by storing the content addresses only of CDFs, but do not track the content addresses of blobs referenced thereby, as that information can be retrieved from the corresponding CDF. Thus, to access a blob, an application program may request retrieval of a CDF that references the blob. The application program may receive the requested CDF and determine the content address of the blob referenced by the CDF. The application program may then use this content address to send a read request for the blob. Because the blob and the CDF are stored on the same storage cluster in one embodiment of the invention, the entity that sent the request for the CDF can send a read request for the blob to the same storage cluster, without needing to perform a search to determine which storage cluster stores the blob.

In another embodiment of the invention, instead of using a search technique to locate data stored on a storage environment, a concept known as intrinsic location addressing may be used. Intrinsic location addressing relates to placing a unit of data on a particular storage cluster based on the content address of the unit of data. Thus, when the unit of data is later read, it is not necessary to perform a search to determine on which storage cluster the unit of data is stored. Instead, the storage cluster that stores the unit of data may again be determined based on the content address of the unit of data.

Figure 6:
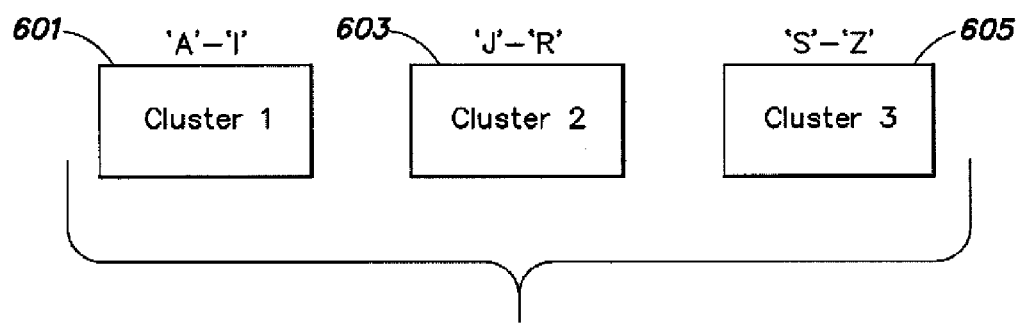
FIG. 6 is a block diagram illustrating the use of intrinsic locations to determine the storage location of a unit of data among multiple clusters, in accordance with one embodiment of the invention.

For example, selected bits of the content address may be used to determine on which storage cluster to store a unit of data. Each storage cluster may be assigned a range of addresses to be stored. For example, the first character of the content address of a unit of data may determine on which storage cluster the unit of data is to be stored. The storage environment of FIG. 6 includes three storage clusters. When the first character is 'A'-'I', the unit of data may be stored on storage cluster 601, when the first character is 'J'-'R', on storage cluster 603, and when the first character is 'S'-'Z', on storage cluster 605. It should be appreciated that this example is illustrative and not limiting. For example it need not be the first character that is examined to determine the storage cluster, and the ranges can differ from those shown so that they need not be of approximately equal size and need not be contiguous.

Figure 7:
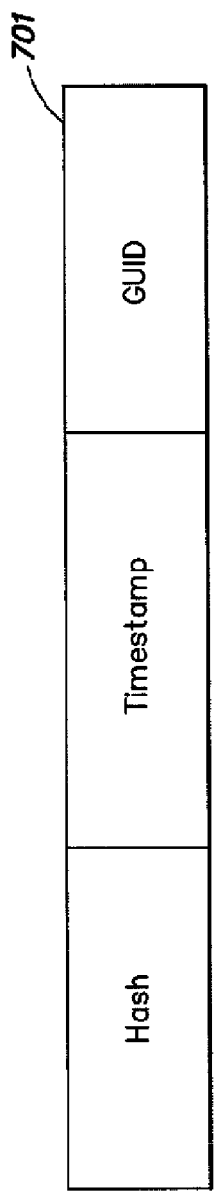
FIG. 7 is a diagram illustrating a content address that can be used to access data stored in accordance with one embodiment of the invention.

As discussed above, the content address of a unit of data may be based, at least in part, on the content of the unit of data, and may be generated in any suitable way, as the present invention is not limited in this respect. For example, the unit of data may be hashed using a hashing algorithm, such as MD5, to generate a portion of the content address. The content address may include other information such as a timestamp that indicates when the unit of data was first written to the storage environment and/or a guaranteed unique identifier (GUID) that ensures the content address is unique, as described in the Related applications. Thus, as shown in FIG. 7, a content address 701 may include a hash value, a timestamp, and a GUID.

In some situations, the unit of data to be written may be too large to compute the hash value before it is desired to have selected a storage location on one of the storage clusters to store the unit of data. For example, the storage environment may not have a buffer large enough to store the entire unit of data while the hash is computed for the unit of data. Thus, in one embodiment of the invention, a technique is employed to enable a storage location in one of the storage clusters to be selected before the hash value of the content address is computed.

Figure 8:
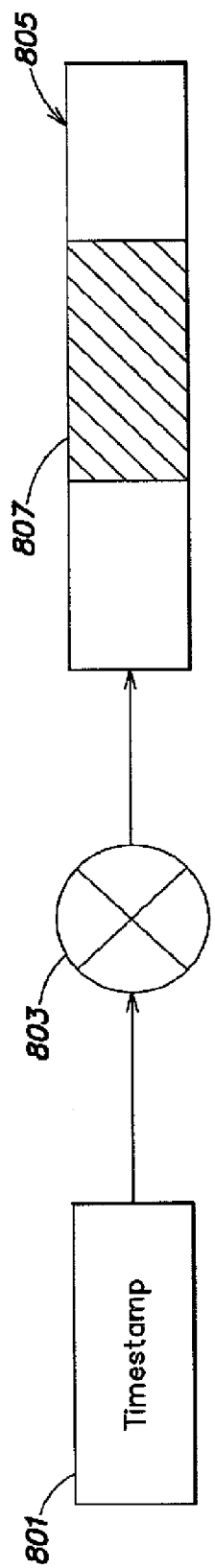
FIG. 8 is a diagram illustrating the generation of a location identifier for use in locating data stored among one of multiple clusters, in accordance with one embodiment of the invention.

Because the hash value may not be available in some situations to select a storage cluster to store the unit of data, it may be desirable to use another portion of the content address (e.g., the timestamp or GUID portion) to select the appropriate storage cluster. As discussed in the Related applications, employing timestamp information can be beneficial in providing a temporal locality of reference for data units written at approximately the same time within a storage system such as one cluster. However, it is desired to not have all data units written at around the same time be written to the same cluster, as this would negatively impact performance by preventing clusters from processing write requests in parallel. Thus, as shown in FIG. 8, to ensure that the portion of the content address used to select the storage cluster (e.g., the timestamp) is sufficiently random, this portion of the content address may be hashed at 803 using an algorithm (MD5 or any other suitable algorithm) to generate a location identifier 805. A portion 807 (or all) of the location identifier 805 may be used to determine which storage cluster should be used to store the unit of data. In this manner, the pseudo-randomness of the hashing algorithm may be employed so that portion 807 is sufficiently random to have an even distribution across the storage clusters for units of data written contemporaneously.

In one embodiment, the location identifier 805 is not saved to assist in retrieving the data unit. Rather, when it is desired to read the unit of data, the portion 801 of the content address may be hashed again to generate location identifier 805 and the portion 807 of the location identifier may be used to determine on which of the storage clusters the unit of data is stored.

It should be appreciated that the use of intrinsic location addressing techniques for selecting a storage cluster to store a unit of data obviates the need to perform a search to locate the unit of data when a read request for the unit of data is issued.

It should be appreciated that when used in conjunction with a content addressable storage system that employs blobs, CDFs and a garbage collection utility as discussed above, the use of the intrinsic location addressing technique may result in a blob and corresponding CDF being stored on different clusters, which can present challenges as discussed above. Accordingly, one embodiment of the invention is directed to a technique for using intrinsic locations to select a storage cluster to store a unit of data in conjunction with a technique to ensure that a CDF and its referenced blob(s) are stored on the same storage cluster. In one embodiment, the technique for ensuring that blobs and its CDFs are stored on the same cluster involves using a common identifier in the content addresses of the CDF and its referenced blob(s), and using this common identifier to determine on which storage cluster to store the CDF and its referenced blobs.

Figure 9:
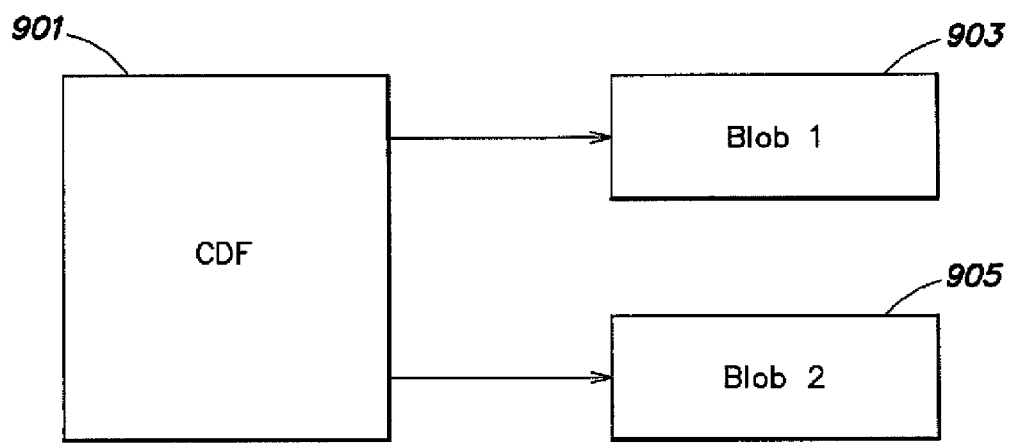
FIG. 9 is a diagram of a content descriptor file (CDF) that references multiple blobs and can be used in a content addressable environment on which aspects of the present invention can be employed, in accordance with one embodiment of the invention.

For example, a CDF and its referenced blobs may be provided with the same GUID in their content addresses. A portion of this GUID (or a portion of a hash of the GUID) may be used to determine on which storage cluster to store a unit of data, so that the CDFs and blobs with the same GUIDs will map to the same storage cluster. For example, FIG. 9 shows a CDF 901 that references two blobs, 903 and 905. In accordance with one embodiment of the invention, these three units of data are stored on the same storage cluster as follows. First, the application program (e.g., 203 in FIG. 2) sends blob 903 to the storage environment. In those embodiments where the host computer 201 has an API to interface with the storage environment, the API may generate a GUID as part of the content address of the blob 903. The facility for selecting a storage cluster (e.g., API 205, appliance 303 or one of the clusters) may select a storage cluster on which to store blob 903. The application program then sends blob 905 to the API. Because the API has not yet received a CDF, the API recognizes that blob 903 and 905 are part of the same transaction (i.e., both referenced by the same CDF) and may use the same GUID in the content address of blob 905. Consequently, blob 903 and 905 will be stored on the same storage cluster. The application program then sends CDF 901 to the API to be stored on the storage environment. The reception of a CDF by the API indicates to the API that the CDF is the last unit of data in the transaction. Thus, API assigns the same GUID to the content address of CDF 901, such that CDF 901 is stored on the same storage cluster as blobs 903 and 905.

In one embodiment, a blob cannot be accessed directly by an application without accessing it through a corresponding CDF. Thus, the CDF must first be read. In accordance with this embodiment, the GUID may be included in the content address of the CDF and used to locate the storage cluster on which the CDF is stored to facilitate a read of the CDF, but the GUID need not be provided in the content address of the blob because the entity charged with locating the storage cluster on which the blob is stored will recognize that the blob is stored on the same storage cluster as the previously read CDF.

When new storage clusters are added to the storage environment, it may be desired to change the selection algorithm for determining on which storage cluster a unit of data is stored so that an even distribution of data units across all of the storage clusters results. For example, if there are three storage clusters in the storage environment, a selection algorithm such as the GUID (in the content address) modulo three may be used to determine on which storage cluster the content is stored. If a fourth storage cluster is added, it may be desired to change the algorithm to GUID modulo four. However, if the new algorithm is applied to content addresses when units of data are read after the addition of the new cluster, the new algorithm may not properly locate data units that were stored on the storage environment prior to the change in algorithm.

Thus, one embodiment of the invention is directed to maintaining information that indicates what algorithm was in making a selection of the cluster for a previously stored data unit. In one embodiment this information identifies the selection algorithm used during certain time periods. Because the content address of the data unit may include a timestamp, the timestamp information may be used to index into the information to determine what algorithm was in place at the time the unit of data was stored. This algorithm can be applied to the appropriate portion of the content address to determine on which storage cluster the unit of data is stored.

An example of information that indicates what algorithm was in use during certain periods of time is shown in FIG. 10. In FIG. 10, line 1001 indicates a time frame for a particular selection algorithm, and indicates that the algorithm was used from time "−1" to time "1019922093021." A value of −1 indicates the beginning of the existence of the storage environment. Line 1003 indicates what algorithm was in effect during the time frame indicated by line 1001, and in the example of FIG. 10 indicates that an algorithm called Fast Blob Naming or FBN was in use. Fast blob naming is an algorithm where a modulus of the hash value and timestamp of the content address is used to determine on which storage cluster a unit of data should be stored. The "mod" indicator indicates the modulus value used in the Fast Blob Naming algorithm. Thus, for example, in line 1003, an algorithm of hash value and timestamp modulo one was used. The result field indicates which results of the algorithm correspond to which storage clusters. In the example of line 1003, the only possible result when using a modulus of 1 is zero. Thus, when the result is zero, the unit of data is stored on storage cluster C1.

Line 1005 indicates that a new algorithm was in effect between time period "101992093021" and "101998383838." As shown in lines 1007 and 1009, the Fast Blob Naming algorithm was used with a modulus of two during that time period, so that when the result of the modular operation was zero, the data unit was stored on cluster C1, and when the result of the modular operation was one, the data unit was stored on cluster C2.

The timestamp of the content address of a unit of data may be used to determine which algorithm to employ in locating a unit of data. For example, if the timestamp of a unit of data were 10199209566, such a timestamp falls within the time period indicated in line 1005. Thus, the algorithm specified by lines 1007 and 1009 may be used to determine which storage cluster stores that unit of data.

Line 1011 indicates that a new algorithm came into effect at time "101998383838," and the end time of "−1" indicates that the algorithm is currently in effect. Lines 1013, 1015, 1017, 1019, and 1021 indicate that a modulus value of 5 was used in the Fast Blob Naming algorithm and that three clusters are currently in use (i.e., clusters C1, C2, and C3). Line 1013 indicates that if the result of the hash value and timestamp modulo five is zero, then the unit of data is stored on cluster C1. If the result is one or two, then the unit of data is stored on cluster C2. If the result is three or four, then the unit of data is stored on cluster C3. Consequently, lines 1013-1021 provide an example of how storage clusters in a storage environment may be weighted so that some storage clusters store more units of data than other storage clusters. Weighting clusters in this manner may be desirable, for example, if one storage cluster has less available capacity than the other storage clusters in the storage environment, or for any other desirable purpose.

Thus, in the example of FIG. 10, of the five possible results of computing the hash value and timestamp modulo five, only one of those results (i.e., zero) causes a unit of data to be stored on cluster C1, while two of those results (i.e., one and two) cause the unit of data to be stored on cluster C2, and the remaining two results (i.e., three and four) cause the unit of data to be stored on cluster C3. Consequently, approximately one fifth of the units of data processed using this algorithm are stored on cluster C1, while approximately two fifths of the units of data are stored on cluster C2 and approximately two fifths of the units of data are stored on cluster C3.

It should be appreciated that the various techniques described herein for selecting a particular storage cluster can be used with any suitable technique for choosing storage locations within a cluster, as the present invention is not limited in this respect. For example, intrinsic location addressing techniques can be used to select a storage cluster but not the storage location within a cluster, or vice-versa, as any pairing of selection techniques can be used.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

In various examples described above, content addresses were described to include alphabetic characters 'A'-'Z'. It should be understood that these content addresses were given only as examples, and that content addresses may include any alphanumeric character, series of bits, or any other suitable character, as the invention is not limited in this respect.

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of accessing a first unit of data stored in a content addressable storage environment that includes a plurality of storage clusters, wherein the content addressable storage environment identifies each unit of data stored thereon using a content address that is based, at least in part, upon at least a portion of the content of the respective unit of data, wherein the content address comprises an identifier used to determine on which of the plurality of storage clusters the respective unit of data is stored, the method comprising acts of:

receiving a request from a host computer to locate the first unit of data previously stored in the storage environment, wherein the request identifies the first unit of data via a first content address that is based, at least in part, upon at least a portion of the content of the first unit of data, wherein the identifier of the first content address comprises a common identifier that is the same as the identifier of a second content address of a second unit of data that is related to the first unit of data, wherein each of the plurality of storage clusters comprises a plurality of nodes, wherein the plurality of nodes in each storage cluster share a software utility that is separate from a software utility used by nodes in other storage clusters of the plurality of storage clusters; and in response to receipt of the request, determining on which one of the plurality of storage clusters the unit of data is stored based, at least in part, on the common identifier of the first content address of the first unit of data.

2. The method of claim 1, wherein the host computer executes an application program that stores data to and retrieves data from the storage environment, wherein the host further executes an application programming interface that interfaces the application program to the storage environment, and wherein the act of receiving is performed by the application programming interface.

3. The method of claim 1, wherein the storage environment is coupled to the host computer by at least one communication link, wherein the host computer, the storage environment, and the at least one communication link form a computer system, wherein the computer system includes an appliance that monitors access requests from the host computer, and wherein the act of receiving the request further comprises an act of receiving, at the appliance, the request from the application.

4. The method of claim 3, wherein the act of determining is performed by the appliance.

5. The method of claim 1, wherein the host computer executes an application program that stores data on the storage environment, and wherein the act of receiving the request further comprises an act of receiving the request directly from the application program.

6. The method of claim 4, wherein the act of receiving the request further comprises an act of receiving the request by at least one of the plurality of storage clusters.

7. The method of claim 6, wherein the at least one of the plurality of storage clusters includes at least one access node that receives and processes access requests, and wherein the act of receiving the request from the application program at the at least one of the plurality of storage clusters further comprises an act of receiving the request at the at least one access node.

8. The method of claim 1, wherein the act of determining comprises an act of performing a search for the first unit of data on the plurality of storage clusters.

9. The method of claim 8, wherein the act of performing a search for the first unit of data further comprises an act of performing the search serially through the plurality of storage clusters until the first unit of data is found.

10. The method of claim 8, wherein the act of performing a search for the first unit of data further comprises an act of performing the search on each of the plurality of storage clusters in parallel.

11. The method of claim 1, wherein the act of determining is performed by at least one of the plurality of storage clusters.

12. The method of claim 1, wherein the act of determining comprises locating the first unit of data on at least one of the plurality of storage clusters without performing a search.

13. The method of claim 1, wherein the first content address includes time information, based on when the first unit of data was stored in the storage environment, and the act of determining comprises an act of determining on which of the plurality of storage clusters the first unit of data is stored based, at least in part, on the time information of the first content address of the first unit of data.

14. The method of claim 13, wherein the act of determining further comprises an act of determining on which of the plurality of storage clusters the first unit of data is stored based, at least in part, on a hash value of the time information of the first content address of the first unit of data.

15. The method of claim 1, wherein the identifier is a guaranteed unique identifier (GUID), and wherein the act of determining further comprises an act of determining on which of the plurality of storage clusters the first unit of data is stored based, at least in part, on the GUID.

16. The method of claim 15, wherein the act of determining further comprises an act of determining on which of the plurality of storage clusters the first unit of data is stored based, at least in part, on a hash of the GUID.

17. The method of claim 1, wherein the act of determining further comprises acts of:

accessing information that specifies an algorithm that was used to select on which of the plurality of storage clusters the first unit of data was stored, based on the first content address of the unit of data; and applying the algorithm to the first content address of the first unit of data to determine on which of the plurality of storage clusters the first unit of data is stored.

18. The method of claim 17, wherein the information specifies a plurality of algorithms used by the storage environment and during which period of time each of the plurality of algorithms was used to store units of data.

19. The method of claim 18, wherein the information further specifies, for each one of the plurality of algorithms, at least one storage cluster that was in the storage environment during the period of time when the one of the plurality of algorithms was in effect.

20. At least one non-transitory computer readable medium encoded with instructions that, when executed on a computer system, perform a method of accessing a first unit of data stored in a content addressable storage environment that includes a plurality of storage clusters, wherein the content addressable storage environment identifies each unit of data stored thereon using a content address that is based, at least in part, upon at least a portion of the content of the respective unit of data, wherein the content address comprises an identifier used to determine on which of the plurality of storage clusters the respective unit of data is stored, and wherein the computer system comprises the storage environment and a host computer that stores data on the storage environment, and wherein the method comprises acts of:

receiving a request from the host computer to locate the first unit of data previously stored in the storage environment, wherein the request identifies the first unit of data via a first content address that is based, at least in part, upon at least a portion of the content of the first unit of data, wherein the identifier of the first content address comprises a common identifier that is the same as the identifier of a second content address of a second unit of data that is related to the first unit of data, wherein each of the plurality of storage clusters comprises one or more nodes, wherein the one or more nodes in each storage cluster share a software utility that is separate from a software utility used by nodes in other storage clusters of the plurality of storage clusters; and in response to receipt of the request, determining on which one of the plurality of storage clusters the first unit of data is stored based, at least in part, on the common identifier of the first content address of the first unit of data, wherein the first unit of data and the second unit of data are stored on the same one of the plurality of storage clusters.

21. The at least one non-transitory computer readable medium of claim 20, wherein the host computer executes an application program that stores data to and retrieves data from the storage environment, wherein the host further executes an application programming interface that interfaces the application program to the storage environment, and wherein the act of receiving is performed by the application programming interface.

22. The at least one non-transitory computer readable medium of claim 20, wherein the computer system further comprises at least one communication link that couples the storage environment to the host computer and an appliance that monitors access requests from the host computer to the storage environment, and wherein the act of receiving the request further comprises an act of receiving, at the appliance, the request from the application.

23. The at least one non-transitory computer readable medium of claim 22, wherein the act of detecting is performed by the appliance.

24. The at least one non-transitory computer readable medium of claim 20, wherein the host computer executes an application program that stores data on the storage environment, and wherein the act of receiving the request further comprises an act of receiving the request directly from the application program.

25. The at least one non-transitory computer readable medium of claim 22, wherein the act of receiving the request further comprises an act of receiving the request at at least one of the plurality of storage clusters.

26. The at least one non-transitory computer readable medium of claim 25 wherein the at least one of the plurality of storage clusters includes at least one access node that receives and processes access requests, and wherein the act of receiving the request from the application program at the at least one of the plurality of storage clusters further comprises an act of receiving the request at the at least one access node.

27. The at least one non-transitory computer readable medium of claim 20, wherein the act of determining comprises an act of performing a search for the first unit of data on the plurality of storage clusters.

28. The at least one non-transitory computer readable medium of claim 27, wherein the act of performing a search for the first unit of data further comprises an act of performing the search serially through the plurality of storage clusters until the first unit of data is found.

29. The at least one non-transitory computer readable medium of claim 27, wherein the act of performing a search for the first unit of data further comprises an act of performing the search on each of the plurality of storage clusters in parallel.

30. The at least one non-transitory computer readable medium of claim 20, wherein the act of determining is performed by at least one of the plurality of storage clusters.

31. The at least one non-transitory computer readable medium of claim 20, wherein the act of determining comprises locating the first unit of data on at least one of the plurality of storage clusters without performing a search.

32. The at least one non-transitory computer readable medium of claim 20, wherein the first content address includes time information, based on when the first unit of data was stored in the storage environment, and the act of determining comprises an act of determining on which of the plurality of storage clusters the first unit of data is stored based, at least in part, on the time information of the first content address of the first unit of data.

33. The at least one non-transitory computer readable medium of claim 32, wherein the act of determining further comprises an act of determining on which of the plurality of storage clusters the first unit of data is stored based, at least in part, on a hash value of the time information of the first content address of the first unit of data.

34. The at least one non-transitory computer readable medium of claim 20, wherein the identifier is a guaranteed unique identifier (GUID), and wherein the act of determining further comprises an act of determining on which of the plurality of storage clusters the first unit of data is stored based, at least in part, on the GUID.

35. The at least one non-transitory computer readable medium of claim 34, wherein the act of determining further comprises an act of determining on which of the plurality of storage clusters the first unit of data is stored based, at least in part, on a hash of the GUID.

36. The at least one non-transitory computer readable medium of claim 20, wherein the act of determining further comprises acts of:
accessing information that specifies an algorithm that was used to select on which of the plurality of storage clusters the first unit of data was stored, based on the first content address of the first unit of data; and
applying the algorithm to the first content address of the first unit of data to determine on which of the plurality of storage clusters the first unit of data is stored.

37. The at least one non-transitory computer readable medium of claim 36, wherein the information specifies a plurality of algorithms used by the storage environment and during which period of time each of the plurality of algorithms was used to store units of data.

38. The at least one non-transitory computer readable medium of claim 37, wherein the information further specifies, for each one of the plurality of algorithms, at least one storage cluster that was in the storage environment during the period of time when the one of the plurality of algorithms was in effect.

39. An apparatus for storing data, wherein the apparatus identifies each unit of data stored thereon using a content address that is based, at least in part, upon at least a portion of the content of the respective unit of data, wherein the content address comprises an identifier used to determine on which of a plurality of storage clusters the respective unit of data is stored, the apparatus comprising:
an input that receives a request from a host computer to locate a first unit of data on at least one of a plurality of storage clusters in a storage environment in which the first unit of data is accessible by a first content address that is based, at least in part, upon at least a portion of the content of the first unit of data, wherein the identifier of the first content address comprises a common identifier that is the same as the identifier of a second content address of a second unit of data that is related to the first unit of data, and
at least one controller coupled to the input, that:
receives the request from the input; and
in response to receipt of the request, determines on which one of the plurality of storage clusters the unit of data is stored based, at least in part, on the common identifier of the first content address of the first unit of data, wherein the first unit of data and the second unit of data are stored on the same one of the plurality of storage clusters,
wherein each of the plurality of storage clusters comprises one or more nodes, wherein the one or more nodes in each storage cluster share a software utility that is separate from a software utility used by nodes in other storage clusters of the plurality of storage clusters.

40. The apparatus of claim 39 in combination with the storage environment, the host computer that accesses data stored in the storage environment; and a communication link that couples the host computer to the storage environment to form a computer system.

41. The apparatus of claim 40, wherein the at least one controller is disposed in the host computer.

42. The apparatus of claim 40, wherein the at least one controller is disposed in the storage environment.

43. The apparatus of claim 40 wherein the at least one controller is disposed in between the storage environment and the host computer in an appliance that monitors access requests from the host computer to the storage environment.

44. The apparatus of claim 39, wherein the host computer executes an application program that stores data to and retrieves data from the storage environment, wherein the host further executes an application programming interface that interfaces the application program to the storage environment, and wherein the at least one controller receives the request at the application programming interface.

45. The apparatus of claim 39, wherein the host computer executes an application program that stores data in the storage environment, and wherein the at least one controller receives the request directly from the application program.

46. The apparatus of claim 42, wherein the apparatus is disposed in at least one of the plurality of storage clusters.

47. The apparatus of claim 46, wherein the at least one of the plurality of storage clusters includes at least one access node that receives and processes access requests, and wherein the at least one controller receives the request at the at least one access node.

48. The apparatus of claim 39, wherein the at least one controller performs a search for the first unit of data on the plurality of storage clusters.

49. The apparatus of claim 48, wherein the at least one controller performs the search serially through the plurality of storage clusters until the first unit of data is found.

50. The apparatus of claim 48, wherein the at least one controller performs the search on each of the plurality of storage clusters in parallel.

51. The apparatus of claim 39, wherein the at least one controller performs the search by at least one of the plurality of storage clusters.

52. The apparatus of claim 39, wherein the at least one controller locates the first unit of data on at least one of the plurality of storage clusters without performing a search.

53. The apparatus of claim 39, wherein the first content address includes time information, based on when the first unit of data was stored in the storage environment, and the at least one controller determines on which of the plurality of storage clusters the first unit of data is stored based, at least in part, on the time information of the first content address of the first unit of data.

54. The apparatus of claim 53, wherein the at least one controller determines on which of the plurality of storage clusters the first unit of data is stored based, at least in part, on a hash value of the time information of the first content address of the first unit of data.

55. The apparatus of claim 54, wherein the identifier is a guaranteed unique identifier (GUID), and wherein the at least one controller determines on which of the plurality of storage clusters the first unit of data is stored based, at least in part, on the GUID.

56. The apparatus of claim 55, wherein the at least one controller determines on which of the plurality of storage clusters the first unit of data is stored based, at least in part, on a hash of the GUID.

57. The apparatus of claim 39, wherein the at least one controller:
accesses information that specifies an algorithm that was used to select on which of the plurality of storage clusters the first unit of data was stored, based on the first content address of the first unit of data; and
applies the algorithm to the first content address of the first unit of data to determine on which of the plurality of storage clusters the first unit of data is stored.

58. The apparatus of claim 57, wherein the information specifies a plurality of algorithms used by the storage environment and during which period of time each of the plurality of algorithms was used to store units of data.

59. The apparatus of claim 58, wherein the information further specifies, for each one of the plurality of algorithms, at least one storage cluster that was in the storage environment during the period of time when the one of the plurality of algorithms was in effect.

60. A method of accessing a first unit of data stored in a content addressable storage environment that includes a plurality of storage clusters and stores data for a host computer, wherein the content addressable storage environment identifies each unit of data stored thereon using a content address that is based, at least in part, upon at least a portion of the content of the respective unit of data, wherein the content address comprises an identifier used to determine on which of the plurality of storage clusters the respective unit of data is stored, the method comprising acts of:
receiving a request from an application program executing on the host computer to store the first unit of data, wherein each of the plurality of storage clusters comprises one or more nodes, wherein the one or more nodes in each storage cluster share a software utility that is separate from a software utility used by nodes in other storage clusters of the plurality of storage clusters; and
in response to receipt of the request, selecting, based, at least in part, on the identifier of the first content address of the first unit of data, wherein the first content address is based, at least in part, upon at least a portion of the content of the first unit of data and wherein the identifier of the first content address comprises a common identifier that is the same as the identifier of a second content address of a second unit of data that is related to the first unit of data, one of the plurality of storage clusters to store the first unit of data in a manner that is transparent to the application program so that the application program is not made aware that the selected one of the plurality of storage clusters stores the first unit of data.

61. The method of claim 60, wherein the host further executes an application programming interface that interfaces the application program to the storage environment, and wherein the act of receiving is performed by the application programming interface.

62. The method of claim 60, wherein the storage environment is coupled to the host computer by at least one communication link, wherein the host computer, the storage environment, and the at least one communication link form a computer system, wherein the computer system includes an appliance that monitors access requests from the host computer, and wherein the act of receiving the request further comprises an act of receiving, at the appliance, the request from the application.

63. The method of claim 60, wherein the act of receiving the request further comprises an act of receiving the request directly from the application program.

64. The method of claim 63, wherein the act of receiving the request from the application program further comprises an act of receiving the request at at least one of the plurality of storage clusters.

65. The method of claim 60, wherein the act of selecting further comprises an act of selecting one of the plurality of storage clusters to store the unit of data using a round-robin technique.

66. The method of claim 60, wherein the act of selecting further comprises an act of selecting one of the plurality of storage clusters to store the first unit of data based on a load of at least one of the plurality of storage clusters.

67. The method of claim 60, wherein the act of selecting further comprises an act of selecting one of the plurality of storage clusters to store the first unit of data based, at least in part, on an available storage capacity of each of the plurality of storage clusters.

68. The method of claim 60, wherein the act of selecting further comprises an act of selecting one of the plurality of storage clusters to store the first unit of data based on a size of the first unit of data.

69. The method of claim 60, wherein the first content address includes time information, based on when the first unit of data was stored in the storage environment, and the act of selecting comprises an act of selecting one of the plurality of storage clusters to store the first unit of data based, at least in part, on the time information of the first content address of the unit of data.

70. The method of claim 69, wherein the act of selecting further comprises an act of selecting one of the plurality of storage clusters to store the first unit of data based, at least in part, on a hash value of the time information of the first content address of the first unit of data.

71. The method of claim 60, wherein the identifier is a guaranteed unique identifier (GUID), and wherein the act of selecting further comprises an act of selecting one of the plurality of storage clusters to store the first unit of data based, at least in part, on the GUID.

72. The method of claim 71, wherein the act of selecting further comprises an act of selecting one of the plurality of storage clusters to store the first unit of data based, at least in part, on a hash of the GUID.

73. The method of claim 60, wherein the act of selecting further comprises acts of:
applying an algorithm to the first content address of the first unit of data to determine on which of the plurality of storage clusters to store the first unit of data;
storing the algorithm in a record that indicates a time frame in which the algorithm was in use.

74. The method of claim 73, wherein the record specifies a plurality of algorithms used by the storage environment and at what period of time each of the plurality of algorithms was used to store units of data.

75. The method of claim 60, further comprising an act of:
storing the first unit of data on the selected one of the plurality of clusters.

76. At least one non-transitory computer readable medium encoded with instructions that, when executed on a computer system, perform a method of accessing a first unit of data stored in a storage environment, wherein the storage environment identifies each unit of data stored thereon using a content address that is based, at least in part, upon at least a portion of the content of the respective unit of data, wherein the content address comprises an identifier used to determine on which of the plurality of storage clusters the respective unit of data is stored, wherein the first unit of data is accessible by a first content address that is based, at least in part, upon at least a portion of the content of the first unit of data, wherein the identifier of the first content address comprises a common identifier that is the same as the identifier of a second content address of a second unit of data that is related to the first unit of data, wherein the storage environment includes a plurality of storage clusters, each storage cluster of the plurality of storage clusters comprising one or more nodes, wherein the one or more nodes in each storage cluster share a software utility that is separate from a software utility used by nodes in other storage clusters of the plurality of storage clusters, and wherein the computer system comprises the storage environment and a host computer that stores data on the storage environment, and wherein the method comprises acts of:
receiving a request from an application program executing on the host computer to store the first unit of data; and
in response to receipt of the request, selecting, based on the first content address of the first unit of data, one of the plurality of storage clusters as to store the first unit of data in a manner that is transparent to the application program so that the application program is not made aware that the selected one of the plurality of storage clusters stores the first unit of data.

77. The at least one non-transitory computer readable medium of claim 76, wherein the host further executes an application programming interface that interfaces the application program to the storage environment, and wherein the act of receiving is performed by the application programming interface.

78. The at least one non-transitory computer readable medium of claim 76, wherein the computer system further comprises at least one communication link that couples the storage environment to the host computer to the storage environment and an appliance that monitors access requests from the host computer, and wherein the act of receiving the request further comprises an act of receiving, at the appliance, the request from the application.

79. The at least one non-transitory computer readable medium of claim 76, wherein the act of receiving the request further comprises an act of receiving the request directly from the application program.

80. The at least one non-transitory computer readable medium of claim 79, wherein the act of receiving the request from the application program further comprises an act of receiving the request at at least one of the plurality of storage clusters.

81. The at least one non-transitory computer readable medium of claim 76, wherein the act of selecting further comprises an act of selecting one of the plurality of storage clusters to store the first unit of data using a round-robin technique.

82. The at least one non-transitory computer readable medium of claim 76, wherein the act of selecting further comprises an act of selecting one of the plurality of storage clusters to store the first unit of data based, at least in part, on an available storage capacity of each of the plurality of storage clusters.

83. The at least one non-transitory computer readable medium of claim 76, wherein the act of selecting further comprises an act of selecting one of the plurality of storage clusters to store the first unit of data based on a load of at least one of the plurality of storage clusters.

84. The at least one non-transitory computer readable medium of claim 76, wherein the act of selecting further comprises an act of selecting one of the plurality of storage clusters to store the first unit of data based on a size of the first unit of data.

85. The at least one non-transitory computer readable medium of claim 76, wherein the first content address includes time information, based on when the first unit of data was stored in the storage environment, and the act of selecting comprises an act of selecting one of the plurality of storage clusters to store the first unit of data based, at least in part, on the time information of the first content address of the first unit of data.

86. The at least one non-transitory computer readable medium of claim 85, wherein the act of selecting further comprises an act of selecting one of the plurality of storage clusters to store the first unit of data based, at least in part, on a hash value of the time information of the first content address of the first unit of data.

87. The at least one non-transitory computer readable medium of claim 76, wherein the identifier is a guaranteed unique identifier (GUID), and wherein the act of selecting further comprises an act of selecting one of the plurality of storage clusters to store the first unit of data based, at least in part, on the GUID.

88. The at least one non-transitory computer readable medium of claim 86, wherein the act of selecting further comprises an act of selecting one of the plurality of storage clusters to store the first unit of data based, at least in part, on a hash of the GUID.

89. The at least one non-transitory computer readable medium of claim 76, wherein the act of selecting further comprises acts of:
applying an algorithm to the first content address of the first unit of data to determine on which of the plurality of storage clusters to store the first unit of data;
storing the algorithm in a record that indicates a time frame in which the algorithm was in use.

90. The at least one non-transitory computer readable medium of claim 89, wherein the record specifies a plurality of algorithms used by the storage environment and during which period of time each of the plurality of algorithms was used to store units of data.

91. The at least one non-transitory computer readable medium of claim 76, wherein the method further comprises an act of:
storing the first unit of data on the selected one of the plurality of clusters.

92. An apparatus for storing data, wherein the apparatus identifies each unit of data stored thereon using a content address that is based, at least in part, upon at least a portion of the content of the respective unit of data, wherein the content address comprises an identifier used to determine on which of a plurality of storage clusters the respective unit of data is stored, the apparatus comprising:
an input that receives a request from an application program executing on a host computer to store a first unit of data on at least one of a plurality of storage clusters in a storage environment in which the first unit of data is accessible by a first content address that is based, at least in part, upon at least a portion of the content of the first unit of data, wherein the identifier of the first content address comprises a common identifier that is the same as the identifier of a second content address of a second unit of data that is related to the first unit of data, and
at least one controller, coupled to the input, that:
receives the request from the input; and
in response to receipt of the request, selects, based on the first content address of the first unit of data, one of the plurality of storage clusters to store the first unit of data in a manner that is transparent to the application program so that the application program is not made aware that the selected one of the plurality of storage clusters stores the first of data,
wherein each of the plurality of storage clusters comprises one or more nodes, wherein the one or more nodes in each storage cluster share a software utility that is separate from a software utility used by nodes in other storage clusters of the plurality of storage clusters.

93. The apparatus of claim 92 in combination with the storage environment, the host computer that accesses data stored in the storage environment; and a communication link that couples the host computer to the storage environment to form a computer system.

94. The apparatus of claim 93, wherein the at least one controller is disposed in the host computer.

95. The apparatus of claim 93, wherein the at least one controller is disposed in the storage environment.

96. The apparatus of claim 93 wherein the at least one controller is disposed in between the storage environment and the host computer in an appliance that monitors access requests from the host computer to the storage environment.

97. The apparatus of claim 94, wherein the host further executes an application programming interface that interfaces the application program to the storage environment, and wherein the at least one controller receives the request at the application programming interface.

98. The apparatus of claim 92, wherein the at least one controller receives the request directly from the application program through the input.

99. The apparatus of claim 95, wherein the at least one controller receives the request at at least one of the plurality of storage clusters.

100. The apparatus of claim 92, wherein the at least one controller selects one of the plurality of storage clusters to store the first unit of data using a round-robin technique.

101. The apparatus of claim 92, wherein the at least one controller selects one of the plurality of storage clusters to store the first unit of data based, at least in part, on an available storage capacity of each of the plurality of storage clusters.

102. The apparatus of claim 92, wherein the at least one controller selects one of the plurality of storage clusters to store the first unit of data based on a load of at least one of the plurality of storage clusters.

103. The apparatus of claim 92, wherein the at least one controller selects one of the plurality of storage clusters to store the first unit of data based on a size of the first unit of data.

104. The apparatus of claim 92, wherein the first content address includes time information, based on when the first unit of data was stored in the storage environment, and the at least one controller selects one of the plurality of storage clusters to store the first unit of data based, at least in part, on the time information of the first content address of the first unit of data.

105. The apparatus of claim 104, wherein the at least one controller selects one of the plurality of storage clusters to store the first unit of data based, at least in part, on a hash value of the time information of the first content address of the first unit of data.

106. The apparatus of claim 92, wherein the identifier is a guaranteed unique identifier (GUID), and wherein the at least one controller selects one of the plurality of storage clusters to store the first unit of data based, at least in part, on the GUID.

107. The apparatus of claim 106, wherein the at least one controller selects one of the plurality of storage clusters to store the first unit of data based, at least in part, on a hash of the GUID.

108. The apparatus of claim 92, wherein the at least one controller: applies an algorithm to the first content address of the first unit of data to determine on which of the plurality of storage clusters to store the first unit of data; and stores the algorithm in a record that indicates a time frame in which the algorithm was in use.

109. The apparatus of claim 108, wherein the record specifies a plurality of algorithms used by the storage environment and during which period of time each of the plurality of algorithms was used to store units of data.

110. The apparatus of claim 92, wherein the at least one controller stores the first unit of data on the selected one of the plurality of clusters.

* * * * *